Oct. 7, 1924.

H. F. FREEMAN

VULCANIZATION APPARATUS

Original Filed Aug. 19, 1921    2 Sheets-Sheet 1

1,510,987

Hadley F. Freeman
INVENTOR

Oct. 7, 1924.
J. C. FRENCH
1,510,988
MULTIPEDAL TRACTION DEVICE
Filed June 17, 1918  2 Sheets-Sheet 2
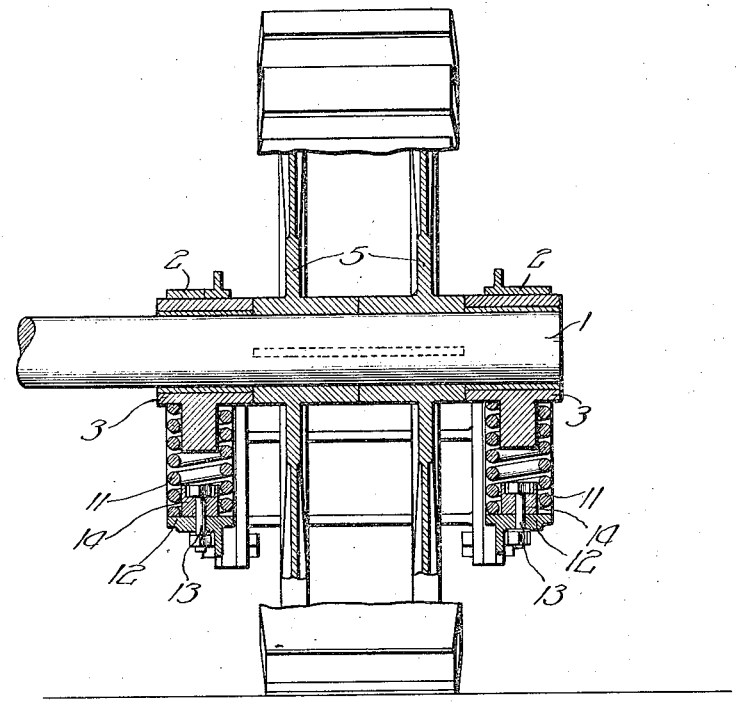
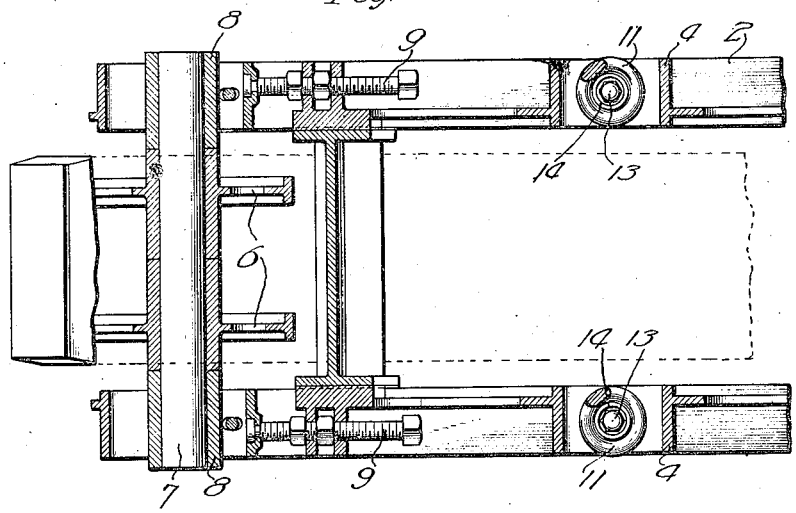

Patented Oct. 7, 1924.

1,510,988

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

MULTIPEDAL TRACTION DEVICE.

Application filed June 17, 1918. Serial No. 240,311.

*To all whom it may concern:*

Be it known that I, JAMES C. FRENCH, a citizen of the United States of America, and resident of Chicago, Illinois, have invented a certain new and useful Improvement in Multipedal Traction Devices, of which the following is a specification.

This invention relates to multi-pedal traction devices of that kind in which a truck-frame is supported on an endless traction belt. Traction devices of this kind are commonly used on excavators, tractors, and other heavy machines, and are adapted to support great weight and to travel over soft places without sinking into the ground. Also, they increase the traction to a considerable extent.

Generally stated, the object of the invention is to provide a novel and improved multi-pedal traction device of the foregoing general character, in which the construction is such that the weight is carried on one or more springs, so that the traction device will ride easily over uneven ground, so as to ensure better traction.

It is also an object to provide certain details and features of construction and combinations tending to increase the general efficiency and desirability of a traction device of this particular construction.

To these and other useful ends the invention consists in matters hereinafter set forth and claimed and shown in the accompanying drawings, in which—

Fig. 2 is an end elevation of said traction device, the central portion thereof being broken away and shown in vertical section on line 2—2 in Fig. 1.

Fig. 3 is a horizontal section on line 3—3 in Fig. 1.

Figure 1:
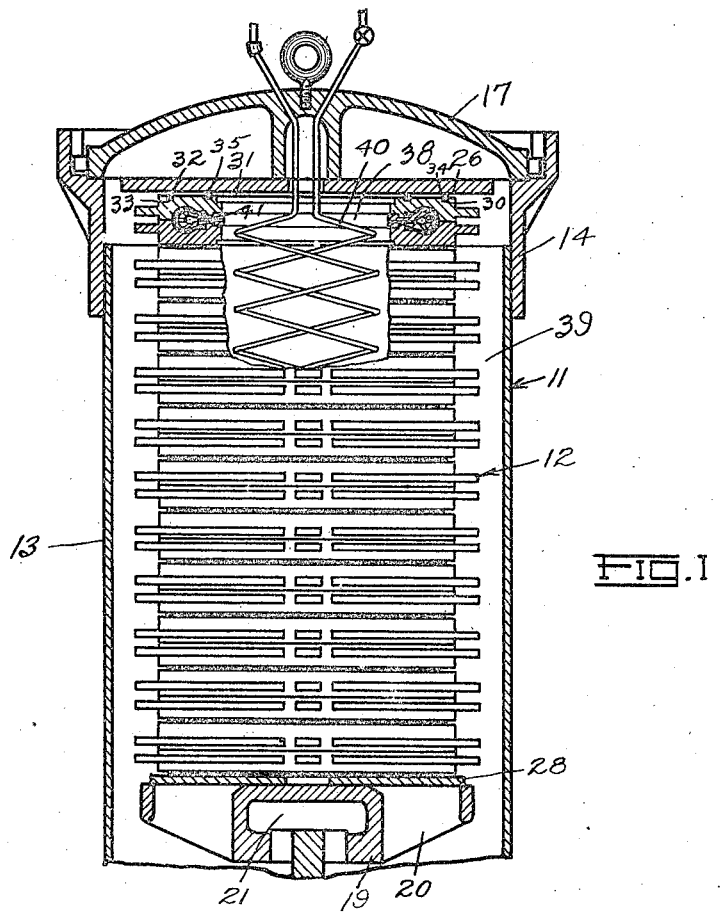
Fig. 1 is a side elevation of a multi-pedal traction device embodying the principles of the invention.

As thus illustrated, the invention comprises an axle 1 mounted in any suitable or desired manner on the body-frame or chassis of the excavator or tractor or motor truck upon which the multi-pedal traction device is employed. A truck-frame 2 is supported to tilt on said axle, being mounted thereon by means of boxes 3 which slide up and down in guides 4 on the sides of said truck-frame. Sprocket wheels 5 are keyed to said axle, and smaller sprocket wheels 6 are suitably mounted at opposite ends of said truck-frame. The axles 7 for the sprocket wheels 6 are suitably supported in sliding boxes 8, which latter are adapted to be adjusted horizontally and longitudinally of the truck-frame by the adjusting screws 9 suitably applied thereto. The caterpillar traction belt 10 may be of any suitable, known, or approved character, and is supported upon sprocket wheels 5 and 6 in the manner shown, so that the bottom portion of the belt rests flatwise upon the ground, while the upper portion of the belt slopes downward at each side of the sprocket wheels 5, the latter holding the belt in elevated position directly above the axle 1, so that the central portion of the device as a whole is higher than the ends thereof. The sprocket wheels 5 also rest upon the bottom portion of the belt 10, and the boxes 3 are supported by springs 11 which rest on shoulders 12 suitably formed on the truck-frame. The bolts 13, provided at their upper ends with washers 14, extend upward through these shoulders to engage the lower ends of the coil springs 11, so that the latter are removably held in place.

With this construction, the weight is communicated from the axle 1 through the springs 11 to the truck-frame, and through the sprocket wheels 6 to the caterpillar belt, whereby the truck-frame can move upward relatively to the axle, as the boxes 3 are adapted to slide downward in their guides. With this construction, therefore, the weight is communicated directly from the axle 1 through the sprocket wheels 5 to the bottom portion of the caterpillar belt 10, and the middle portion of the belt can move downward under the weight of the sprocket wheels 5, when the coil springs 11 are compressed, and in this way the sprocket wheels 5 always rest firmly upon the bottom portion of the belt. The caterpillar belt is driven by the sprocket wheels 5 when the axle 1 is rotated, and the springs 11 communicate some of the weight through the sprocket wheels 6 to the belt, as stated, but the sprocket wheels 5 always rest firmly upon the belt, and will move downward with the belt if the latter sags or moves downward at the center thereof, as in traveling over uneven ground, and in such case the bottom portion of the belt would be higher at the front and rear ends thereof than at the middle. This insures a constant and effective driving connection between the axle and the belt, and enables the belt to conform to some extent to the uneven surfaces over which it may be compelled to travel.

What I claim as my invention is:

1. In a multi-pedal traction device, the combination of a large central sprocket wheel, an axle upon which said wheel is carried and by which it is driven, a truck frame having a central vertical guide formed therein and relatively small sprocket wheels adjustably mounted in the opposite ends thereof, a traction belt extending about said sprockets, vertically slidable bearings for said axle arranged in said guide, a spring interposed between said bearings and the frame for yieldingly imposing a part of the load on said belt through said frame and small sprocket wheels, and a part thereof directly through said large sprocket wheel, whereby said belt may be constantly driven by said large sprocket wheel and the end and central lower portions thereof on the ground may respectively accommodate themselves to ground conditions, the frame being permitted to tilt about said axle.

2. In a multi-pedal traction device, the combination of a central sprocket wheel, an axle upon which said wheel is carried and by which it is driven, a truck frame adapted to support said axle and tiltable thereon, said frame having relatively small sprocket wheels adjustably mounted in the opposite ends thereof, an endless traction belt extending around said sprockets, a spring interposed between said axle and said frame for yieldingly distributing a portion of the load carried by said axle to said belt through said frame and said small sprocket wheels, and yieldingly distributing a portion of said load to said belt directly through said sprocket wheel, whereby said belt may be constantly driven by said large sprocket wheel and the end and central portions thereof permitted to accommodate themselves to ground conditions.

Signed by me at Chicago, Ill., this 31st day of May 1918.

JAMES C. FRENCH.